Figure 1:
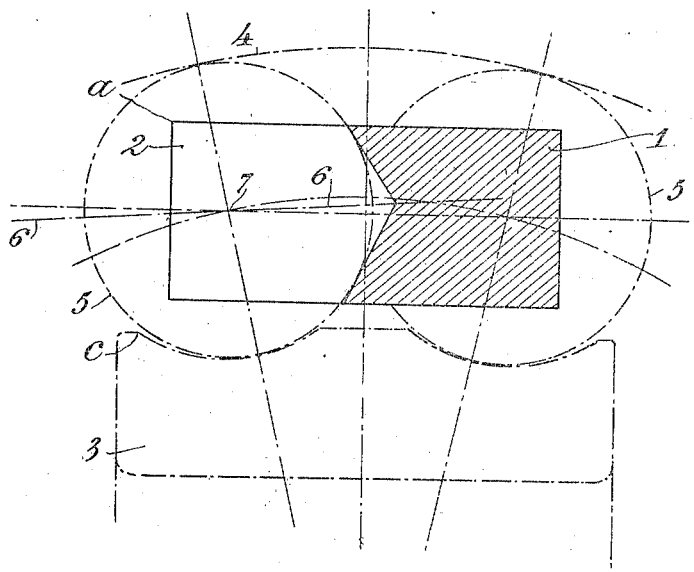

A. G. E. HULTGREN AND P. S. RYDBECK.
BALL RETAINER FOR DOUBLE ROW RADIAL BALL BEARINGS.
APPLICATION FILED MAR. 21, 1918.

1,303,479.

Patented May 13, 1919.

INVENTORS:
Axel Gustaf Emanuel Hultgren
and Patrik Samuel Rydbeck
By Attorneys,

WITNESS:

A. G. E. HULTGREN AND P. S. RYDBECK.
BALL RETAINER FOR DOUBLE ROW RADIAL BALL BEARINGS.
APPLICATION FILED MAR. 21, 1918.

1,303,479.

Patented May 13, 1919.
2 SHEETS—SHEET 2.

UNITED STATES PATENT OFFICE.

AXEL GUSTAF EMANUEL HULTGREN AND PATRIK SAMUEL RYDBECK, OF GOTTENBORG, SWEDEN, ASSIGNORS TO AKTIEBOLAGET SVENSKA KULLAGERFABRIKEN, OF GOTTENBORG, SWEDEN, A CORPORATION OF SWEDEN.

BALL-RETAINER FOR DOUBLE-ROW RADIAL BALL-BEARINGS.

1,303,479.     Specification of Letters Patent.     Patented May 13, 1919.

Application filed March 21, 1918. Serial No. 223,849.

*To all whom it may concern:*

Be it known that we, AXEL GUSTAF EMANUEL HULTGREN and PATRIK SAMUEL RYDBECK, subjects of the King of Sweden, and residents of Gottenborg, Sweden, have invented certain new and useful Improvements in Ball-Retainers for Double-Row Radial Ball-Bearings, of which the following is a specification, reference being had therein to the drawings accompanying and forming a part thereof.

This invention relates to ball retainers, and particularly to ball retainers for double row radial ball bearings which consist of one or more rings, or the like, having lateral bores forming pockets for the balls, or corresponding depressions or recesses (for instance in ball retainers of pressed sheet-metal).

In ball retainers of this kind hitherto known, the center lines of the bores, or recesses, were always directed axially, and the dimensions of the ball retainer, *i. e.* the width and the thickness of the ring, were chosen, for a certain size of the bearing, with regard to the diameter of the balls, and also with regard to the kind of radial ball bearings in which the ball retainer was intended to be used. Thus, for instance, in a ball bearing of a certain predetermined size and a certain predetermined ball diameter, the thickness of the ring can be considered to be fixed, and the width of the ring only depends on the type of bearing, *i. e.* on whether the bearing is of the rigid or of the self-alining type.

In a bearing of the first mentioned type, in which the balls run in grooves in both bearing rings, the task of the ball retainer is confined to the keeping of the balls of each row at predetermined distances from one another, and in such case the width of the ring need only be made so much larger than the distance between the center planes of the rows of balls that the balls obtain a sufficient contact surface in the peripheral direction.

In, so-called, self-alining radial ball bearings, the ball retainer has a further mission, viz. to firmly retain the balls in the grooved bearing ring when the bearing rings are swung relatively to each other to such an extent that the balls lose their contact with the spherical inner surface of the outer ring.

This condition will be fulfilled if the smallest circle determined by the two outermost points of a ball pocket and a point at the outer shoulder of the grooved bearing ring is less than the circumference of a ball. This implies that the insertion of the last balls into the ball retainer placed in position in the bearing takes place under pressure and by means of the elasticity of the ball retainer.

Obviously, the capability of the ball retainer of holding the balls increases as the diameter of the aforesaid circle decreases.

A known means of accomplishing this result consists in making the width of the ball retainer ring larger than necessary for firmly supporting the balls in the peripheral direction, *i. e.* by making the said width considerably larger than the distance between the center planes of the rows of balls. This entails, however, for one thing, that the ball retainer will be comparatively large and, for the other, that the depth of the pockets increases, by which the cost of manufacture will be increased. Particularly in using solid ball retainers, they will be heavy and, consequently, disadvantageous in working.

A likewise known means consists in increasing the height of the outer shoulders of the grooved bearing ring beyond the normal one, which is determined, for a certain known diameter of the balls, so that the groove obtains a sufficient width. An increase of the diameter of the outer shoulders implies, however, a corresponding increase of the width of the said bearing ring, but, on account of the standardizing of the modern annular ball bearings, this width must be fixed for each separate kind of bearing, and, therefore, also this means is disadvantageous.

An equally known means for securing the balls in position consists in this that, in ball bearings in which the outer bearing ring is interiorly spherical in shape, the center lines of the ball pockets are situated somewhat nearer to the axis of the bearing, and, in ball bearings having a spherical inner bearing ring, somewhat farther from the said axis, than are the centers of the balls. This entails, however, that the diameter of the ball pockets is made larger than the diameter of the balls and that the balls are placed eccentrically in the pockets, which, for one thing, implies a weakening of the ball retainer and, for the other, has proved itself to be disadvantageous in other respects.

This invention has for its object to provide a ball retainer of the kind described, which, while maintaining a width slightly larger than the distance between the center planes of the rows of balls, and without the normal dimensions of the bearing rings being changed, firmly retains the balls and at the same time does not prevent that, theoretically, the diameter of the ball pockets is made equal to the diameter of the balls.

With this object in view, the invention consists, chiefly, in the center lines of the ball pockets having oblique directions relatively to the axis of rotation of the bearing. Preferably, the said center lines lie on a cone the axis of which coincides with the axis of the bearing. It is obvious that the apex of the said cone must be situated at the same side of the radial center plane of the bearing as the corresponding row of balls or at the opposite side thereof, respectively, according as the spherical surface is arranged at the outer or at the inner ring of the bearing. Obviously, the center lines of the ball pockets may as well be arranged so as to coincide with a hyperbolic surface the axis of which coincides with the axis of the bearing.

Figure 2:
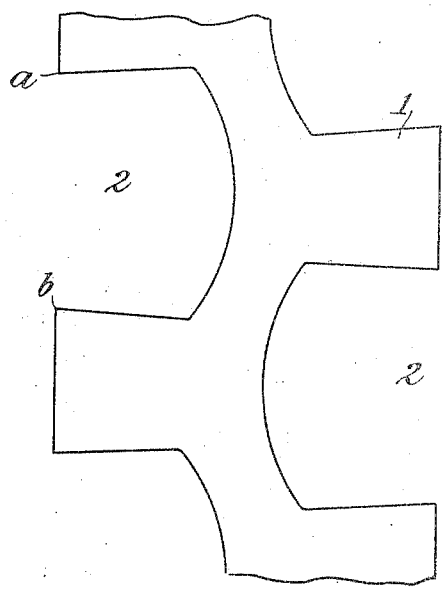
Figure 3:
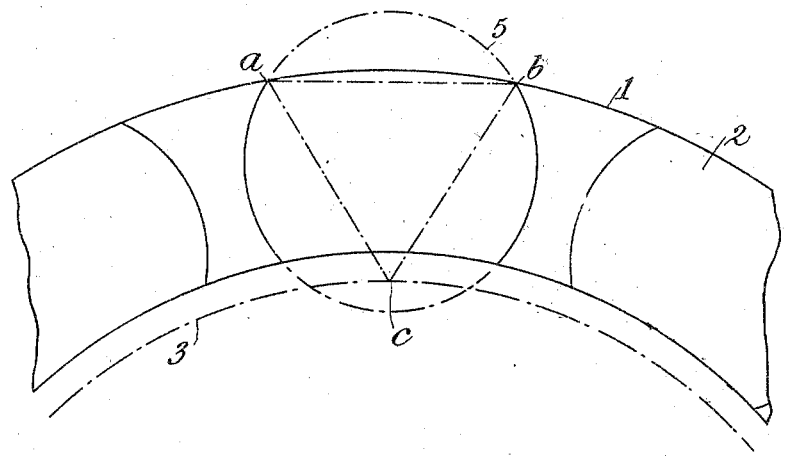
Figure 4:
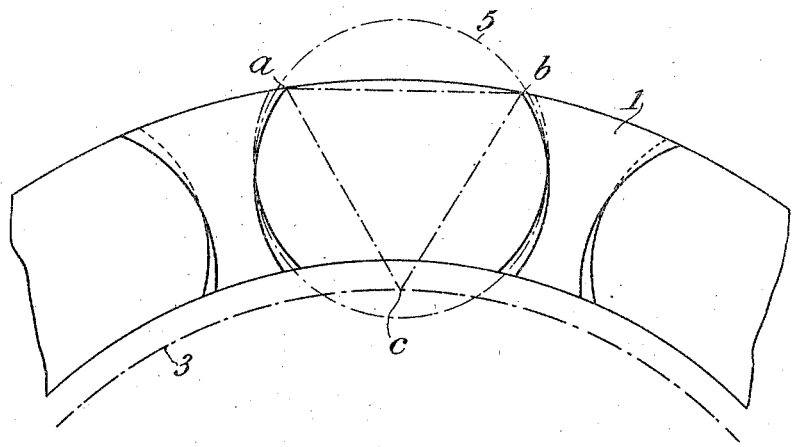

In the drawings, Figures 1 and 2 show a solid ball retainer according to the invention adapted for a double row ball bearing having an internally spherical outer ring. Fig. 1 is a cross-section of part of the ball retainer (the balls and the race rings indicated by dashed and dotted lines). Fig. 2 is a partial side elevation of the said ball retainer. Fig. 3 is a partial end view of a known ball retainer, and Fig. 4 is a similar end view of a ball retainer according to the invention.

Referring to the drawings, the ball retainer consists, in the form of embodiment shown, of a solid ring 1 having lateral bores 2. The condition of the balls being retained at the inner race ring 3, even if the latter be swung relatively to the outer race ring 4 to such an extent that the balls 5 are brought out of contact with the last-mentioned ring, is, as known, that the circle determined by the two outermost points $a$ and $b$ of a ball pocket and the point $c$ lying symmetrically in relation to the said points $a$ and $b$, on the outer shoulder of the inner bearing ring, is smaller than the circumference of the ball 5.

It is obvious that the capability of the ball retainer of retaining the balls at the bearing ring 3 is increased as the circle through the three points $a$, $b$, and $c$ aforesaid is diminished.

A means of diminishing the said circle consists, according to the invention, in arranging the ball pocket 2, or the center line 6—6 thereof, obliquely in relation to the axis of the bearing, as shown in Fig. 1. The center line is here considered as the axis of a cylindrical bore forming the pocket, and the several center lines as lying in a conical surface the axis of which coincides with the axis of the bearing. It further passes through the center point 7 of the ball 5, as shown, by which the diameter of the ball pocket 2 can, theoretically, be made equal to the diameter of the ball.

In comparing the ball retainers shown in Figs. 3 and 4, it clearly appears that the distance between the points $a$ and $b$ in Fig. 4 is less than the corresponding distance in Fig. 3. Also the distances $c$—$a$ and $c$—$b$ in Fig. 4 are less than the corresponding distances in Fig. 3.

The said distances are chosen so that the last balls can be pressed into the corresponding pockets by means of the elasticity of the ball retainer.

It is further obvious that the use of the ball retainer is not limited to, so-called, self-alining ball bearings, but it may be used in double row radial ball bearings of any kind.

What we claim is:—

1. A ball retainer for radial ball bearings, consisting of a ring having lateral bores or recesses serving as pockets for the balls, and in which the center lines of the said ball pockets extend obliquely in relation to the axis of rotation of the bearing, and a portion of the ring overhangs the outer sides of the balls to hold them against the inner ball race of the bearing.

2. A ball retainer for double row radial ball bearings, consisting of a ring having on opposite sides lateral bores or recesses serving as pockets for the balls, and in which the center lines of the said ball pockets extend obliquely in relation to the axis of rotation of the bearing, the obliquity being such that a portion of the ring overhangs the outer sides of the balls to hold them from escaping outwardly.

3. A ball retainer for radial ball bearings, consisting of a ring having lateral bores or recesses serving as pockets for the balls, and in which the center lines of the said ball pockets extend obliquely in relation to the axis of rotation of the bearing, and pass through the centers of the balls, the latter arranged on rotative axes forming lines also oblique to such axis, the respective oblique lines lying on cones directed both to the same side of the row of balls.

4. A ball retainer for radial ball bearings consisting of a ring of solid metal having ball pockets consisting of recesses entering the ring laterally and each constituting a segment of a cylinder the axis of which is oblique to the axis of rotation of the bearing, their obliquity being such that the pockets slightly overhang the balls at the outer side of the ring and at the open ends of the pockets, whereby to prevent the outward escape of the balls.

In testimony whereof we affix our signatures.

AXEL GUSTAF EMANUEL HULTGREN.
PATRIK SAMUEL RYDBECK.